(12) United States Patent
Cerrina

(10) Patent No.: US 7,560,417 B2
(45) Date of Patent: Jul. 14, 2009

(54) METHOD AND APPARATUS FOR PARALLEL SYNTHESIS OF CHAIN MOLECULES SUCH AS DNA

(75) Inventor: Francesco Cerrina, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 527 days.

(21) Appl. No.: 11/034,632

(22) Filed: Jan. 13, 2005

(65) Prior Publication Data

US 2006/0154264 A1 Jul. 13, 2006

(51) Int. Cl.
*C40B 60/00* (2006.01)
(52) U.S. Cl. .......................... 506/33; 506/30; 422/130; 422/134
(58) Field of Classification Search ................. None
See application file for complete search history.

(56) References Cited

U.S. PATENT DOCUMENTS

| | | | |
|---|---|---|---|
| 4,353,989 A | 10/1982 | Bender et al. | |
| 5,112,575 A | 5/1992 | Whitehouse et al. | |
| 5,262,530 A | 11/1993 | Andrus et al. | |
| 5,869,643 A | 2/1999 | Chatelain et al. | |
| 6,001,311 A | 12/1999 | Brennan | |
| 6,024,925 A | 2/2000 | Little et al. | |
| 6,083,682 A * | 7/2000 | Campbell et al. | 435/4 |
| 6,375,903 B1 | 4/2002 | Cerrina et al. | |
| 6,469,157 B1 | 10/2002 | Chatelain et al. | |
| 6,586,211 B1 | 7/2003 | Stahler et al. | |
| 6,623,703 B1 | 9/2003 | Chatelain et al. | |
| 6,693,187 B1 * | 2/2004 | Dellinger | 536/25.3 |

(Continued)

FOREIGN PATENT DOCUMENTS

WO    WO 98/53093    11/1998

(Continued)

OTHER PUBLICATIONS

Cardona et al (2002 Helvetica Chimica Acta 85:3532-3558).*

(Continued)

*Primary Examiner*—Christopher Low
*Assistant Examiner*—Christopher M. Gross

(57) ABSTRACT

Synthesis of chain molecules such as DNA is carried out in a conduit having an interior channel with an inlet end and an outlet end. At least one wall of the conduit is substantially transparent to selected wavelengths of light. Solid carrier particles are contained within the interior channel of the conduit. A plurality of controllable light sources are mounted at spaced locations along the length of the transparent wall of the conduit to allow selective illumination of separated sections of the particles within the conduit. When a light source is turned on, a photodeprotecting group is removed from the carrier particles in the section that is illuminated by the light source. A reagent containing a selected base is flowed through the conduit so that the base will attach to the carrier particles in those sections which have been exposed to light and deprotected. Reagents may be applied which subsequently again protect the bases followed by selective application of light to certain sections, removal of the deprotection group, and attachment of a new base, with the process repeated until desired sequences have been formed on the carrier particles at each of the separated sections in the conduit. The synthesized molecules may then be removed for direct use or further processing.

19 Claims, 5 Drawing Sheets

U.S. PATENT DOCUMENTS

| | | |
|---|---|---|
| 7,083,975 B2 * | 8/2006 | Green et al. ............. 435/289.1 |
| 7,122,799 B2 * | 10/2006 | Hsieh et al. ............ 250/339.12 |
| 2002/0160427 A1 | 10/2002 | Beier et al. |
| 2003/0068633 A1 | 4/2003 | Belshaw et al. |
| 2003/0138789 A1 | 7/2003 | Stahler et al. |
| 2003/0138790 A1 | 7/2003 | Schlauersbach et al. |
| 2003/0143132 A1 | 7/2003 | Cerrina et al. |
| 2003/0143550 A1 | 7/2003 | Green et al. |
| 2003/0143724 A1 | 7/2003 | Cerrina et al. |
| 2003/0148502 A1 | 8/2003 | Green et al. |
| 2003/0198948 A1 | 10/2003 | Stahler et al. |
| 2004/0010081 A1 | 1/2004 | Guimil et al. |
| 2004/0043509 A1 | 3/2004 | Stahler et al. |
| 2004/0175490 A1 | 9/2004 | Stahler et al. |
| 2004/0175734 A1 | 9/2004 | Stahler et al. |

FOREIGN PATENT DOCUMENTS

| | | |
|---|---|---|
| WO | WO 99/09042 | 2/1999 |
| WO | WO 99/60170 | 11/1999 |
| WO | WO 00/13017 | 3/2000 |
| WO | WO 00/13018 | 3/2000 |

OTHER PUBLICATIONS

Barany et al (1985 JACS 107:4936-4942).*

Kathryn E. Richmond, et al., "Amplification and Assembly of Chip-Eluted DNA (AACED): A Method for High-Throughput Gene Synthesis," Nucleic Acids Research, vol. 32, No. 17, 2004, pp. 5011-5018.

* cited by examiner

US 7,560,417 B2

METHOD AND APPARATUS FOR PARALLEL SYNTHESIS OF CHAIN MOLECULES SUCH AS DNA

REFERENCE TO GOVERNMENT RIGHTS

This invention was made with United States government support awarded by the following agency: DOD ARPA Grant DAAD 19-02-2-0026. The United States government has certain rights in this invention.

FIELD OF THE INVENTION

This invention pertains generally to the field of synthesis of chain molecules such as DNA and related polymers.

BACKGROUND OF THE INVENTION

Various alternatives to conventional DNA (deoxyribonucleic acid) sequencing have been proposed. One such alternative approach, utilizing an array of oligonucleotide probes synthesized by photolithographic techniques, is described in Pease, et al., "Light-Generated Oligonucleotide Arrays for Rapid DNA Sequence Analysis," Proc. Natl. Acad. Sci. USA, Vol. 91, pp. 5022-5026, May 1994. In this approach, the surface of a solid support modified with photolabile protecting groups is illuminated through a photolithographic mask, yielding reactive hydroxyl groups in the illuminated regions. A 3' activated deoxynucleoside, protected at the 5' hydroxyl with a photolabile group, is then provided to the surface such that coupling occurs at sites that had been exposed to light. Following coupling and oxidation, the substrate is rinsed and the surface is illuminated through a second mask to expose additional hydroxyl groups for additional coupling. A second 5' protected activated deoxynucleoside base is presented to the surface. The selective photodeprotection and coupling cycles are repeated to build up levels of bases until the desired set of probes is obtained. It may be possible to generate high density miniaturized arrays of oligonucleotide probes using such photolithographic techniques wherein the sequence of the oligonucleotide probe at each site in the array is known. These probes can then be used to search for complementary sequences on a target strand of DNA, with detection of the target that has hybridized to particular probes accomplished by the use of fluorescent markers coupled to the targets and inspection by an appropriate fluorescence scanning microscope. A variation of this process using polymeric semiconductor photoresists, which are selectively patterned by photolithographic techniques, rather than using photolabile 5' protecting groups, is described in McGall, et al., "Light-Directed Synthesis of High-Density Oligonucleotide Arrays Using Semiconductor Photoresists," Proc. Natl. Acad. Sci. USA, Vol. 93, pp. 13555-13560, November 1996, and G. H. McGall, et al., "The Efficiency of Light-Directed Synthesis of DNA Arrays on Glass Substrates," Journal of the American Chemical Society 119, No. 22, 1997, pp. 5081-5090.

A disadvantage of both of these approaches is that four different lithographic masks are needed for each monomeric base, and the total number of different masks required are thus up to four times the length of the DNA probe sequences to be synthesized. The high cost of producing the many precision photolithographic masks that are required, and the multiple processing steps required for repositioning of the masks for every exposure, contribute to relatively high costs and lengthy processing times. Techniques have been developed for the creation of arrays of probe sequences, polypeptides, and other large chain molecules using patterning processes that do not require multiple masks. See U.S. Pat. No. 6,375,903, and published United States patent application publication Nos. 2003/0068633, 2003/0143132, 2003/0143550, 2003/0143724, 2003/0148502, 2004/0126757, and 2004/0132029, which are incorporated herein by reference. The synthesis of oligomers in the production of high density microarrays is typically carried out on flat glass substrates. The amount of a particular oligomer synthesized in this manner is in the range of femtomoles. For example, for a typical oligomer density of about 20 picomoles/cm$^2$, a DNA microarray 1.5 cm×1.7 cm in size will yield approximately 50 picomoles total. If the microarray chip contains 250 different oligomer sequences, the amount of each particular oligomer will be about 200 femtomoles, and likely even less taking into account the chip areas lost to controls, etc. It would be highly desirable to increase the amount of each oligomer to the 1-100 picomoles range. However, increasing the active area of the flat microarray substrate surface to increase the amount of oligomers produced is generally not practical.

Standard phosphoramidite synthesizers generate a small number of oligomers in amounts of several nanomoles or greater for each oligomer, while microarray synthesizers can generate a large number of different oligomers in parallel but in the femtomole range for each oligomer. For purposes of gene synthesis, an adequate amount of each oligomer would be in the 1-1000 picomoles range, which is enough material to yield the concentration needed for synthesis and assembly. Thus, much of the output of conventional synthesizers is unnecessary, and potentially wasted, while DNA microarrays are able to produce many more oligomers at one time than standard synthesizers but at less than optimum amounts.

SUMMARY OF THE INVENTION

In accordance with the present invention, synthesis of large numbers of chain molecules, such as DNA, can be carried out rapidly, efficiently, and in a cost effective manner. In the application of the invention to the production of DNA, molecules having a few bases to a hundred bases or more may be efficiently synthesized in any desired base sequence and with multiple oligonucleotides synthesized simultaneously, with subsequent release of the oligonucleotides as fragments or sections which can be assembled to form desired DNA sequences. Many different oligomers may be synthesized in parallel in relatively large amounts, e.g., in the range of picomoles for each oligomer, without the need for complex optics or optical modulators, thus reducing the cost of production.

In an apparatus in accordance with the invention for use in synthesis of chain molecules such as DNA, a conduit is used having an interior channel with an inlet end and an outlet end. At least one wall of the conduit along the interior channel for at least a portion of the length of the channel is substantially transparent to selected wavelengths of light. Solid carrier particles are contained within at least a portion of the interior channel of the conduit having the transparent wall without being attached to the conduit. The surfaces of the carrier particles are coated with a material that acts as a group linker between the surface of the particle and the chain molecule to be formed. The carrier particles have a diameter substantially less than the width of the channel so that multiple carrier particles pack each section of the channel between the walls of the channel. The carrier particles are otherwise free from attachment to each other or to the walls of the conduit. The conduit may be formed of a thin walled capillary tube, such as a quartz tube, and the carrier particles may comprise spherical quartz particles of a diameter from a few microns to several hundred microns or more. However, the conduit may also be formed in other ways, including solid fluid guiding structures, in which the channel is formed within the solid structure of the conduit, and the carrier particles may be formed in shapes other than spheres, for example, as cylinders, fibers, or irregular shapes, and with smooth or structured surfaces. For example, the carrier particles may be formed of controlled porosity glass (CPG) or similar porous materials which provide a large surface area to mass ratio. A plurality of controllable light sources are mounted at spaced positions along the length of the transparent wall of the conduit to allow selective illumination of separated sections of the particles packed within the conduit in the separated sections. The light sources may comprise, for example only, light emitting diodes (LEDs) which are mounted adjacent to the length of the conduit in position to couple light emitted from the LEDs through the transparent wall of the conduit into the interior channel to illuminate the surfaces of the particles packed therein. However, any other controllable light source providing appropriate wavelength light may be used. Separators may be positioned between adjacent sections of particles to block transmission of light between sections.

In the synthesis of chain molecules, when a light source is turned on, the photodeprotecting group is removed from the carrier particles in the sections of the packed carrier particles which are illuminated. A reagent containing a selected base (e.g., adenine (A)), is flowed through the channel and the base will attach to the carrier particles in those sections that have been exposed to light and deprotected. A reagent containing the photodeprotecting group may then be flowed through the conduit to protect the oligomers, with subsequent illumination of selected ones of the multiple light sources carried out to deprotect selected sections of the carrier particles, followed by flowing of another base (e.g., guanine (G)) to attach where the photodeprotecting group has been removed. The process can be repeated multiple times to form a desired sequence of bases at each of the separated sections along the length of the conduit. The number of different sequences that can be formed is determined by the number of light sources and separated sections (e.g., 20 to 100 light sources or more). After completion of the synthesis, the oligomer can be eluted by flowing a reagent through the conduit which detaches all of the oligomers from the carrier particles. In addition, removal of selected oligomers can be obtained by utilizing photolabile attachment of the oligomers to the carrier particles so that a single oligomer sequence or several selected sequences can be removed by appropriate illumination of the sections from the light sources. A controller may be connected to the light sources and the reagent supply to provide reagents to the channel in a selected sequence and to illuminate sections of the channel in a selected sequence.

The light sources emit light of a selected wavelength, and lenses and/or mirrors may be mounted with the sources to couple and focus the light from the sources onto the sections of the channel. The sources may also be mounted to the conduit such that a face of the source (e.g., a light emitting diode) from which light is emitted forms a portion of the transparent wall of the conduit. Light blocking material may be mounted between adjacent sources in position to prevent light from one source passing into a section of the channel that is to be illuminated by an adjacent source. The conduit may be filled with an index matching fluid to minimize scattering losses. The apparatus may further include a transparent window spaced from the transparent wall of the conduit and including an enclosure forming an enclosed region with the window and the transparent wall of the conduit. An index matching fluid within the enclosed region has an index of refraction near that of the transparent wall of the conduit to minimize reflections at the transparent wall of the conduit. The light sources may be mounted outside of the window in position to project light through the window, the index matching fluid, and the transparent wall of the conduit. The window can include an antireflective coating thereon to minimize unwanted reflections and dispersion of light. Where the conduit has walls which are all transparent to light, a material may be formed adjacent to the conduit, between the separated sections to be illuminated, which absorbs or reflects light transmitted through the walls of the conduit to minimize stray light.

Further objects, features and advantages of the invention will be apparent from the following detailed description when taken in conjunction with the accompanying drawings.

DETAILED DESCRIPTION OF THE INVENTION

Figure 1:
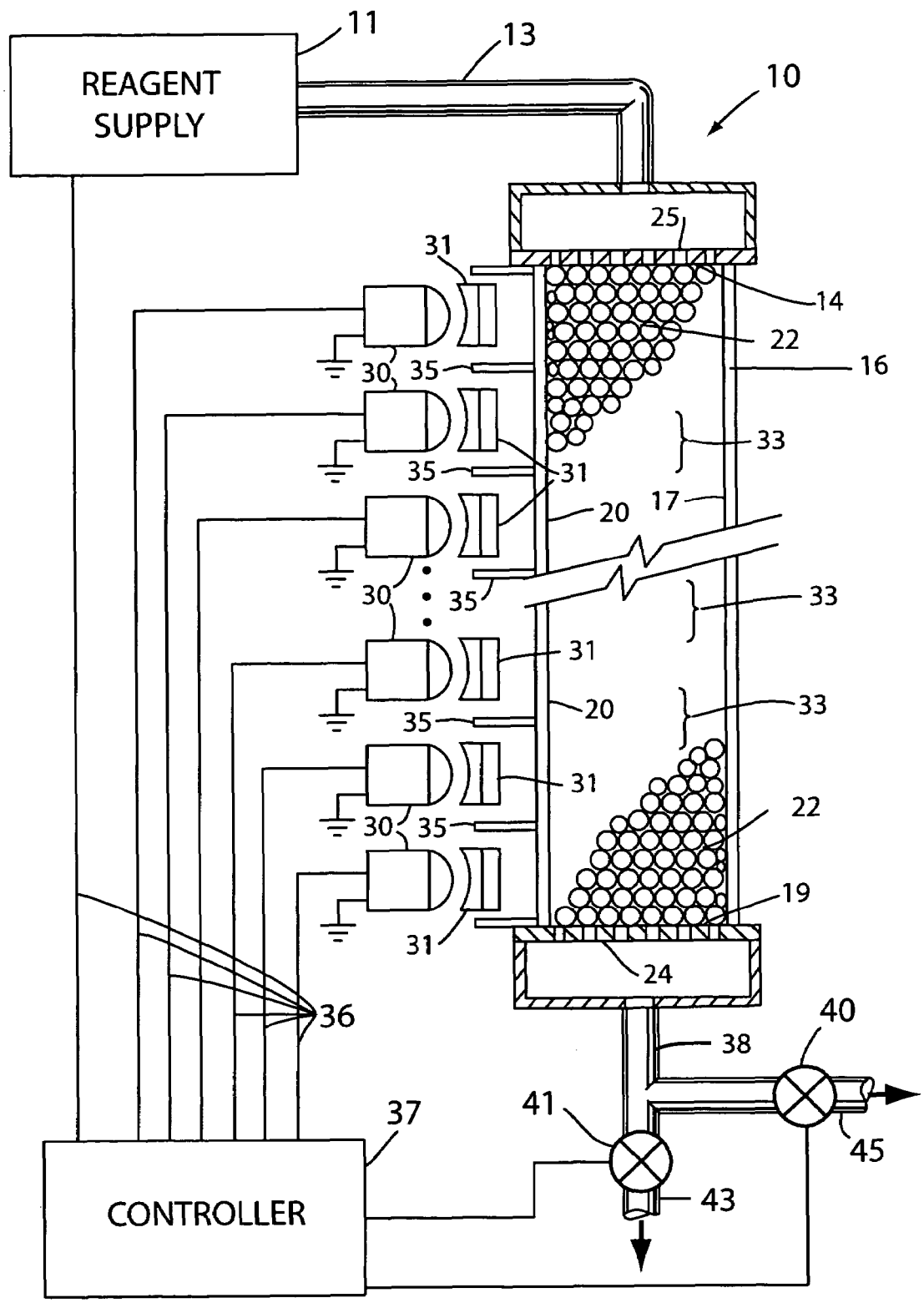
FIG. 1 is a partially schematic view of an apparatus for use in synthesis of chain molecules in accordance with the invention.

With reference to the drawings, an apparatus for use in synthesis of chain molecules in accordance with the invention is shown generally at 10 in FIG. 1. In the apparatus 10, a reagent supply 11 is utilized to provide selected reagents, as discussed further below, in sequence on a supply line 13 that provides the liquid reagents to the inlet end 14 of a conduit 16. The conduit 16 has an interior channel 17 through which the reagents flow to an outlet end 19 of the channel in the conduit. As illustrated in FIG. 1, the conduit 16 can be formed as a thin walled capillary tube in which the channel 17 is the cylindrical interior bore of the capillary tube conduit. The wall 20 of the conduit 16 may be formed of a substantially transparent material, such as glass or quartz, so that light from outside the conduit can be transmitted through the wall of the conduit and thence into the interior channel 17. The channel 17 holds a large number of solid carrier particles 22 which may be spherical as shown, but which may also have other shapes such as cylinders or fibers, etc., formed of a variety of materials such as quartz, glass, plastic, and CPG glasses and other porous materials. The particles 22 may have sections of different sizes or optical properties to better control flow of reagent, improve the exposure uniformity and better control scattered light. The particles 22 may be held within the channel 17 by a perforated screen 24 at the outlet 19 of the channel and preferably also by a screen 25 at the inlet end 14 of the channel. The screens 24 and 25 have openings formed therein which are sized to allow fluid from the reagent supply 11 to pass freely therethrough while blocking passage of the carrier particles 22 through the openings, thus holding the particles 22 within the channel without fixing or attaching the particles to the walls of the channel. The fluid from the reagent supply flows through the interstices between the particles 22 so that the flowing fluid is in contact with a large proportion of the surface area of the particles 22 as the fluid flows through the conduit. Thus, the total area on which chain molecules can be formed is many times greater than the interior surface area of the channel 17, and generally is far greater than the surface area of the flat substrates conventionally used in DNA microarrays. The reagent supply 11 may be, for example, a conventional DNA synthesizer supplied with the requisite chemicals.

A plurality of controllable light sources 30 are mounted at spaced positions along the length of the transparent wall 20 of the conduit to allow selective illumination of separated sections of the conduit and of the particles held therein in the separated sections. As illustrated in FIG. 1, light emitted from the sources 30 may be focused by lenses 31 before passing through the wall 20 of the conduit to illuminate separated sections 33 of the particles within the conduit. Light absorbing or blocking elements 35 may be mounted between each of the light sources 30 to minimize stray light from one light source being directed to the region to be illuminated by an adjacent light source. The light sources 30 may be any convenient light source, for example, light emitting diodes (LEDs), which are selectively supplied with power on lines 36 from a computer controller 37, such that any combination of the light sources can be turned at a particular point in time. Any other controllable light source may be utilized, including individual lamps of any type that can be turned on and off, constantly burning lamps with mechanical shutters (including movable mirrors as well as light blocking shutters) or electronic shutters (e.g., liquid crystal light valves), and fiber optic or other light pipes transmitting light from single or multiple sources, etc. The controller 37 is also connected to controllable valves 40 and 41 which are connected to an output line 38 which receives the fluid from the outlet end 19 of the conduit. The controller 37 can control the valves 40 and 41 to either discharge the reagents that have been passed through the conduit onto a waste (collection) line 43, or to direct oligomers which have been released from the conduit onto a discharge line 45 which can be directed to further processing equipment or to readers, etc.

In operation, the reagent supply initially provides fluid flowing through the conduit that creates a photodeprotective group covering the surfaces of the carrier particles 22. The flow of reagent is then stopped and the controller 37 turns on a selected combination of the light sources 30 (typically at ultraviolet (UV) wavelengths) to illuminate selected ones of the separated sections 33 of the packed particles within the conduit. In a conventional manner, the light emitted from each active source 30 renders the photodeprotective group susceptible to removal by a reagent which is passed through the conduit by the reagent supply 11, following which the reagent supply can be controlled to provide a desired molecular element, such as a nucleotide base (A,G,T,C) which will bind to the surfaces of the carrier particles from which the photodeprotective group has been removed. Thereafter, the reagent supply can then provide further photodeprotective group material through the conduit to protect all bases, followed by activation and illumination from selected sources 30 to allow removal of the photodeprotective group from the particles in selected sections of the conduit. After removal of the susceptible photodeprotective material, the reagent supply 11 can then provide another base material that is flowed through the conduit to attach to existing bases on the carrier particles which have been exposed. The process as described above can be repeated multiple times until a sufficient size of chain molecule is created. Each of the light sources 30 can separately illuminate one of the separated sections of packed particles, allowing different sequences of, e.g., nucleotides within the oligomers formed at each of the separated sections. Various DNA and other molecular synthesis chemistries and procedures may be utilized, for example, as discussed in the patents and published patent applications and papers discussed above. The molecules produced in accordance with the invention may be used to create longer chain molecules, including entire genes, and to allow selective release of the formed oligomers for transport out of the conduit with liquid flowing through the conduit. See, e.g., published U.S. Patent Application Publication No. 2003/0068633A1 (Apr. 10, 2003), and Kathryn E. Richmond, et al., "Amplification and Assembly of Chip-Eluted DNA (AACED): A Method for High-Throughput Gene Synthesis," Nucleic Acids Research, Vol. 32, No. 17, September 2004, pp. 5011-5018, which are incorporated by reference.

Although it is preferable that the controller 37 be an automated controller, for example, under computer control, with the desired sequence of reagents and activated light sources 30 programmed into the controller, it is also apparent and understood that the reagent supply 11 and the light sources 30 can be controlled manually and by analog or digital control equipment which does not require the use of a computer.

Figure 2:
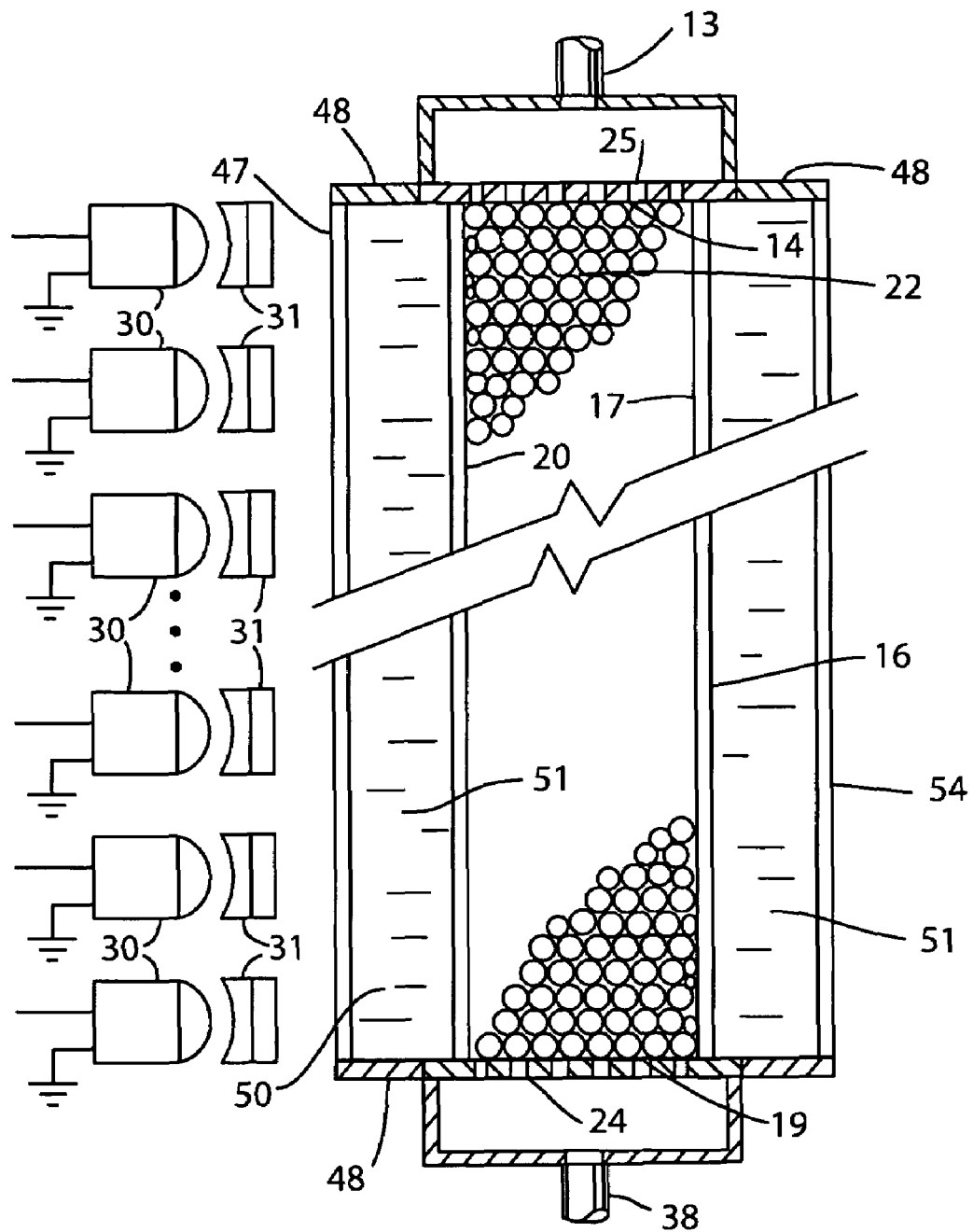
FIG. 2 is a partial schematic view of an arrangement of the conduit and light sources for the apparatus of FIG. 1.

Light from the light sources 30 may be coupled into the conduit 16 in various ways within the scope of the invention. For example, as shown in FIG. 2, the light sources 30 may be mounted outside of a transparent window 47 which, with an enclosure 48 and the transparent wall 20 of the conduit, forms an enclosed space 50 which is filled by an index matching fluid 51. If desired, another window 54 can be mounted on the side of the conduit opposite the position in the transparent wall at which the light from the light sources 30 is received and, with the wall 20 and enclosure 48, can define an enclosed region filled with index matching fluid 51 so that light which passes through the conduit 16 and the particles 22 can exit through the matching fluid and the transparent window 54. The fluid 51 is preferably chosen to match closely the index of refraction of the transparent wall 20, and the windows 47 and 54 are preferably also chosen to have a similar index of refraction, to minimize unwanted reflections and dispersion of light from one separated section 33 to another section 33 which is to be illuminated by a different light source 30. The fluid that passes through the interior channel 17 of the conduit also preferably has an index of refraction similar to that of the transparent wall 20 of the conduit as well as that of the fluid 51.

Figure 3:
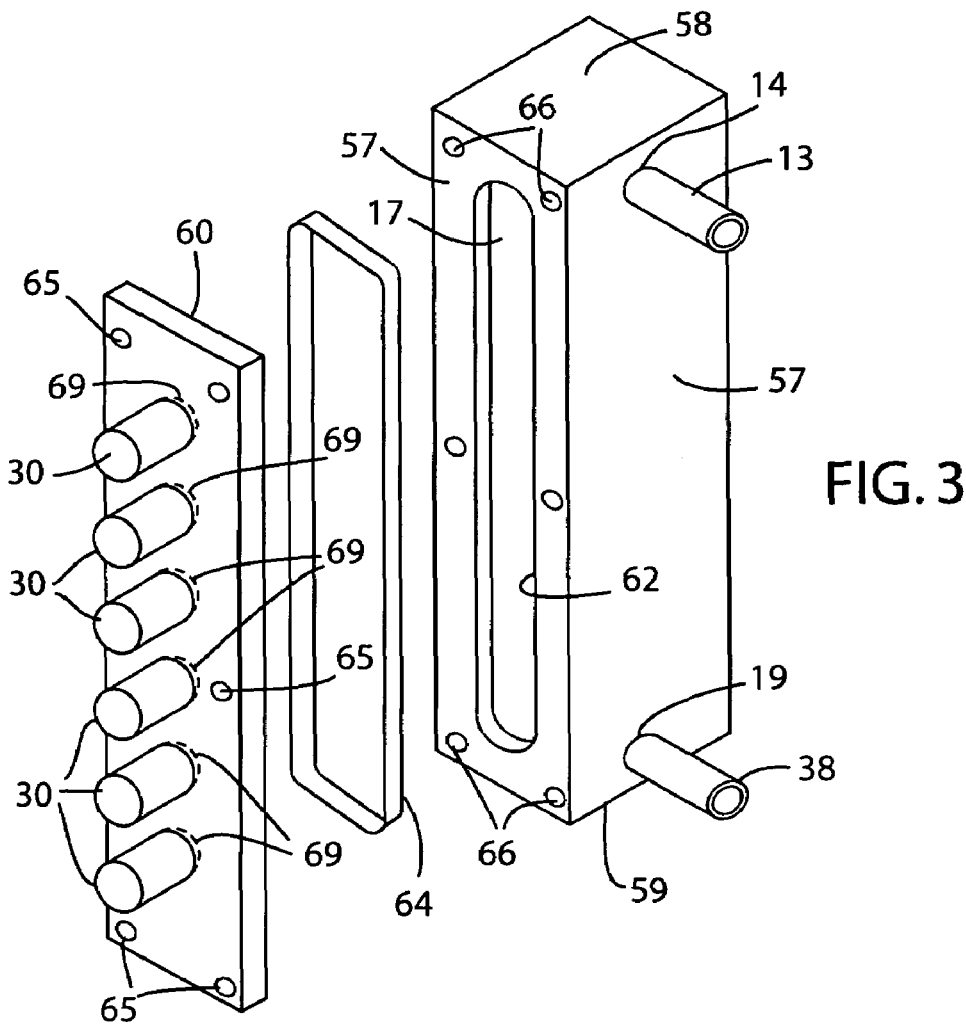
FIG. 3 is another embodiment of the conduit and light sources for use in the present invention.

Although the conduit 16 can take the form of a transparent thin-walled capillary tube, the conduit is not limited to such constructions, nor is it limited to having all transparent walls. A further example of a conduit structure in accordance with the present invention is shown in FIG. 3 in which the conduit 16 has flat opaque sidewalls 57 and top and bottom walls 58 and 59, respectively, which together define an enclosed channel leading from an inlet end 14 at which fluid is received from the supply line 13 into the interior channel 17 of the conduit, and an outlet 19 which discharges fluid from the interior channel to the output line 38. The light sources 30 are mounted to a flat plate 60 through openings therein, with fluid tight seals being formed between each of the light sources 30 and the plate 60. The plate 60 is then attached to the facing wall 57 which has an opening 62 formed therein. The line of light sources 30 is mounted to face the opening 62 so that light from each of the sources 30 passes through the opening 62 into the interior channel 17 of the conduit. A gasket 64 is preferably mounted between the plate 60 and the face of the wall 57 to provide a fluid-tight seal, and the plate 60 can be attached to the conduit 16 in any desired fashion, for example, by screws passed through screw holes 65 in the plate 60 into threaded holes 66 within the wall 57 of the conduit. In this case, the transparent wall of the conduit is formed in multiple sections by the transparent front faces 69 of the light sources 30, so that the light from each light source is directly coupled through the transparent face 69 of the light source to the fluid within the channel 17 of the conduit 16 of FIG. 3. As is apparent from FIG. 3, the conduit is not limited to any particular shape, nor is it necessary that the interior channel 17 of the conduit be straight, long and narrow. For example, the channel may be curved or serpentine. Moreover, the channel 17 may be formed in other manners, such as within a solid block which defines the conduit, with the channel 17 being formed as a groove within the block which is closed by a cover, which may be transparent or have transparent openings therein; or by any other structural arrangement which provides for directed flow of reagents through a channel packed with carrier particles from an inlet to an outlet and where light from multiple light sources can be selectively coupled into the channel at selected, spaced sections of the channel.

Figure 4:
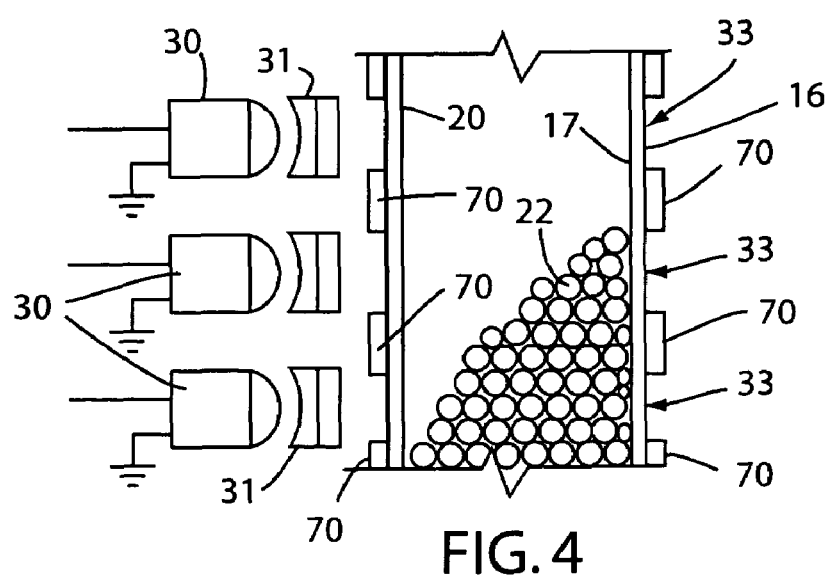
FIG. 4 is a partial view of another embodiment of a conduit having transparent walls and light absorbing or reflecting material around the conduit to minimize the transmission of light from one section of the conduit to another.

FIG. 4 illustrates a further embodiment of the invention in which the conduit 16 is formed as a transparent walled capillary tube in which light from each of the light sources 30 is coupled into a separated section 33 of the channel, wherein the separated sections are defined by light blocking material 70 wrapped around the conduit 16 at positions above and below the section 33 which are to receive light from the light source 30. The light blocking material 70 may be formed to either absorb or reflect light to thereby restrict the amount of light that is transmitted from a section 33 to an adjacent section. The light that passes through the conduit 16 may be directed to a light trap, as illustrated in FIG. 4, or light absorbing material may be formed on the outside of the conduit 16 at a position opposite the light source 30 so as to absorb light that passes through both walls of the conduit.

Figure 5:
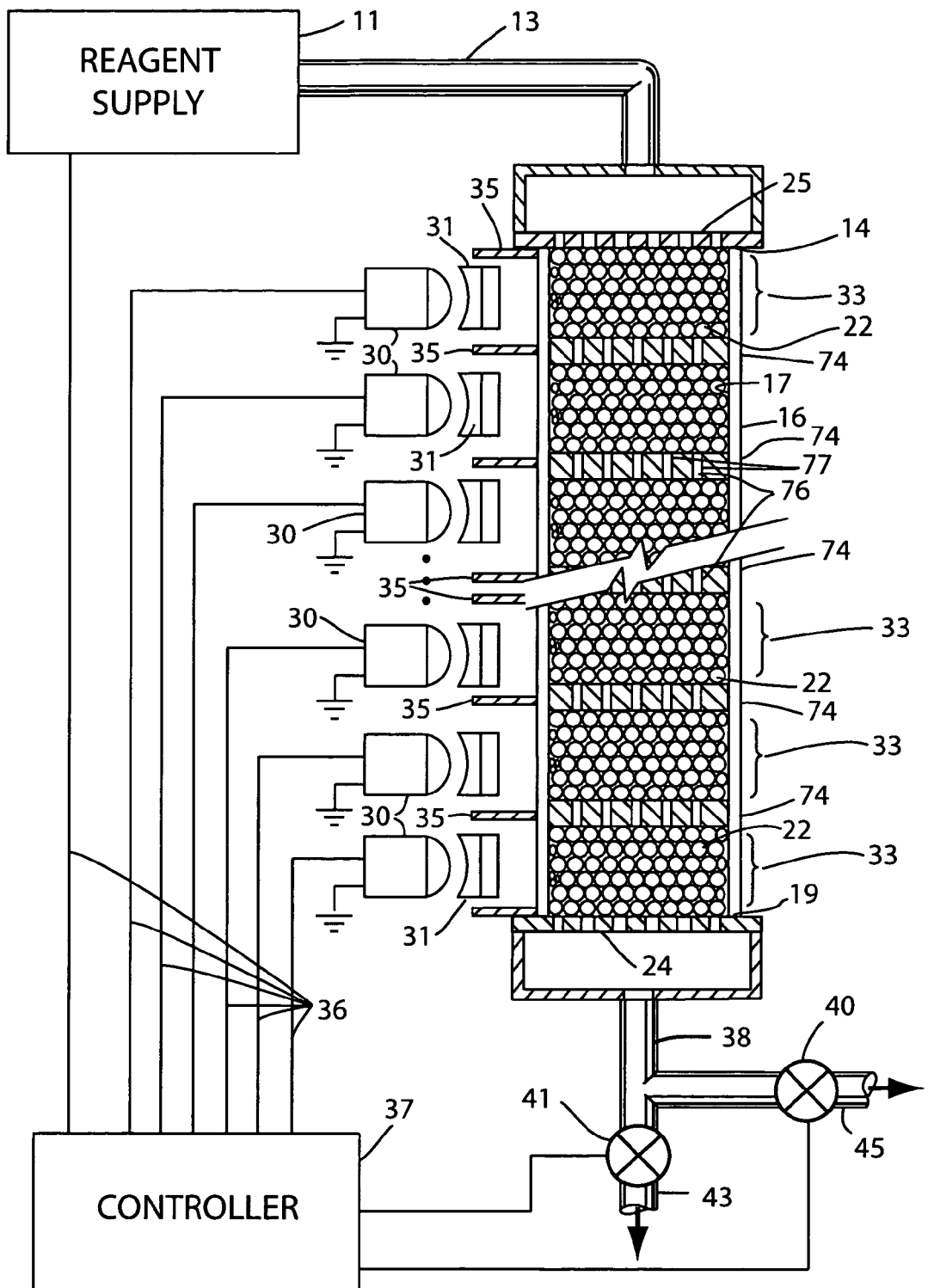
FIG. 5 is a view of apparatus in accordance with the invention similar to that in FIG. 1 with light blocking separators between the separate sections of particles in the conduit.
Figure 6:
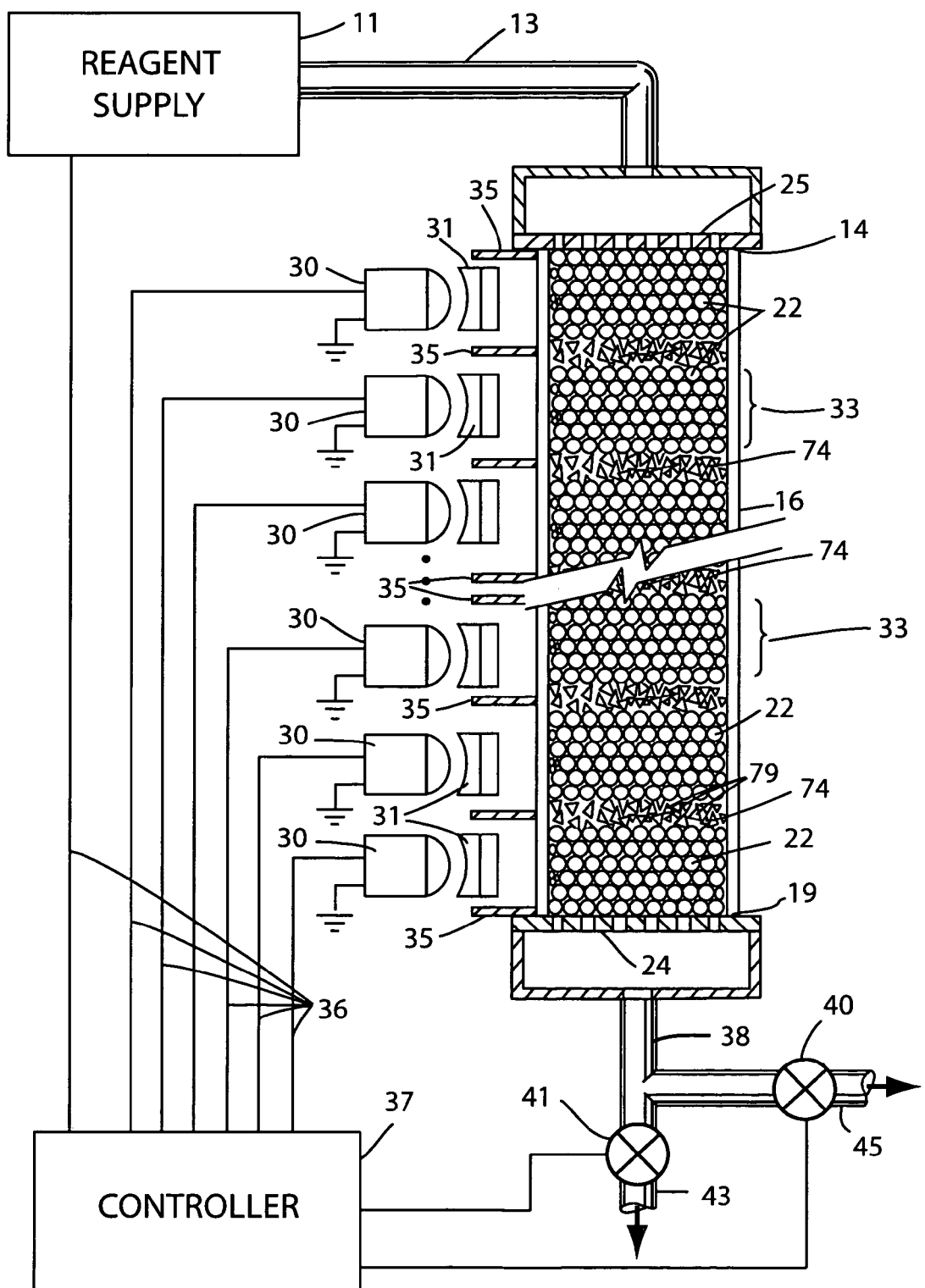
FIG. 6 is a view of apparatus in accordance with the invention similar to that in FIG. 1 with separators formed of light blocking particles interposed between the separate sections of active particles within the conduit.

As illustrated in FIGS. 1, 2 and 4, the separated sections of particles 22 may be physically spaced from one another by similar particles 22 that are not illuminated or otherwise do not participate in the molecular synthesis process. It should be understood that the sections 33 of particles may be separated in any other way, such as by being in spaced sections of a serpentine channel, by restrictions in the channel between sections 33 that block flow of the individual particles 22, etc. FIGS. 5 and 6 illustrate a synthesis apparatus similar to that in FIG. 1 in which the sections 33 of the particles 22 are physically and optically isolated from one another as well as being separated. In the apparatus of FIG. 5, a separator 74 is interposed between each of the adjacent sections 33. The separator 74 may be formed, for example, of a plug 76 of solid material (e.g., Teflon, other plastics, black glass, metals) that blocks transmission of light between adjacent sections 33, and with one or more channels 77 extending therethrough which allow flow of liquid through the separators but which are sized to block passage of the particles 22. The channels 77 may be straight or tortuous. The separators 74 may also be formed of plugs of mesh or porous material which allow flow of liquid but block passage of the particles 22. As illustrated in FIG. 6, the separators 74 may be formed of packed particles 79 which are made of a light absorbing or blocking material that blocks transmission of light between the sections 33, while nonetheless allowing flow of liquid through the packed particles 79. Where solid separator plugs 76 are utilized, it is not necessary that the particles 22 in each section 33 be tightly packed together, and the particles may be filled into the sections 33 between the separators 74 at a density that allows the particles 22 to move around freely as liquid flows past them, which may facilitate exposure of all surface areas of each particle 22 to the reaction liquid and to the light from a light source 30. If desired, after synthesis of the molecules has been completed, all of the particles 22 (and 74 in the apparatus of FIG. 6) may be removed from the conduit to facilitate release of the formed molecules from the particles 22 and/or to clean or recondition the particles.

It is understood that the invention is not confined to the particular embodiments set forth herein as illustrative, but embraces all such forms thereof as come within the scope of the following claims.

What is claimed is:

1. Apparatus for use in synthesis of chain molecules comprising:
   (a) a conduit having an interior channel with an inlet end and an outlet end, the conduit having at least one wall along the interior channel for at least a portion of the channel that is substantially transparent to selected wavelengths of light;
   (b) solid carrier particles within at least a portion of the interior channel of the conduit having the transparent wall;
   (c) a plurality of controllable light sources directed toward the transparent wall at spaced positions along the length of the conduit and positioned to selectively illuminate separated sections of the particles in the conduit in the separated sections, wherein the separated sections are optically isolated such that light from one light source is prevented from passing into a section that is to be illuminated by an adjacent light source; and
   (d) a reagent supply connected to the inlet end of the conduit to selectively supply reagents thereto.

2. The apparatus of claim 1 further including a controller connected to the light sources and the reagent supply to control them to supply reagent to the channel in a selected sequence and to illuminate sections of the channel in a selected sequence.

3. The apparatus of claim 1 wherein the light sources comprise light emitting diodes which emit light of a selected wavelength when supplied with electricity.

4. The apparatus of claim 3 further including lenses mounted with the light emitting diodes to focus light emitted from the diodes onto the selected sections of the channel.

5. The apparatus of claim 3 wherein the light emitting diodes are mounted to the conduit such that a face of the light emitting diode from which light is emitted forms a portion of the transparent wall of the conduit.

6. The apparatus of claim 3 further including light blocking material mounted between adjacent light emitting diodes in position to prevent light from one light emitting diode passing into a section of the channel that is to be illuminated by an adjacent light emitting diode.

7. The apparatus of claim 1 wherein the conduit is formed as a capillary tube and the channel is an interior bore of the capillary tube and wherein the capillary tube is formed of a transparent material.

8. The apparatus of claim 7 wherein the capillary tube is formed of quartz.

9. The apparatus of claim 1 wherein the carrier particles are formed as microspheres having a diameter in the range of 1 µm to 1000 µm.

10. The apparatus of claim 9 wherein the microspheres are formed of quartz.

11. The apparatus of claim 1 wherein the carrier particles are porous.

12. The apparatus of claim 11 wherein the carrier particles are formed of controlled porosity glass.

13. The apparatus of claim 1 including a transparent window spaced from the transparent wall of the conduit and including an enclosure forming with the window and the transparent wall of the conduit an enclosed region, an index matching fluid within the enclosed region which has an index of refraction near that of the transparent wall of the conduit to minimize reflections at the transparent wall of the conduit, the light sources being mounted outside of the window and positioned to project light through the window, the index matching fluid, and the transparent wall of the conduit.

14. The apparatus of claim 13 wherein the window includes an antireflective coating thereon.

15. The apparatus of claim 1 wherein the conduit has walls which are all transparent to light and further including a material adjacent to the conduit between the separated sections to be illuminated which blocks the transmission of light through the walls of the conduit to minimize stray light.

16. The apparatus of claim 1 including separators between adjacent separated sections of particles that block light transmission and flow of carrier particles therethrough while allowing passage of liquid.

17. The apparatus of claim 16 wherein the separators are formed of solid plugs having channels therethrough that allow flow of liquid but are sized to block passage of carrier particles.

18. The apparatus of claim 1, wherein the light sources are light-emitting light sources.

19. The apparatus of claim 16 wherein the separators are packed particles of a light absorbing or light blocking material.

* * * * *